(12) United States Patent
Wu et al.

(10) Patent No.: US 11,469,504 B2
(45) Date of Patent: Oct. 11, 2022

(54) ELECTRONIC DEVICE AND ANTENNA STRUCTURE THEREOF

(71) Applicant: PEGATRON CORPORATION, Taipei (TW)

(72) Inventors: Chien-Yi Wu, Taipei (TW); Chao-Hsu Wu, Taipei (TW); Shih-Keng Huang, Taipei (TW); Tse-Hsuan Wang, Taipei (TW); Yi-Ru Yang, Taipei (TW); Hau-Yuen Tan, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 49 days.

(21) Appl. No.: 17/124,878

(22) Filed: Dec. 17, 2020

(65) Prior Publication Data

US 2021/0203070 A1    Jul. 1, 2021

(30) Foreign Application Priority Data

Dec. 25, 2019    (TW) .................................. 108147531

(51) Int. Cl.
| | |
|---|---|
| *H01Q 1/50* | (2006.01) |
| *H01Q 5/335* | (2015.01) |
| *H01Q 1/48* | (2006.01) |
| *H01Q 9/04* | (2006.01) |
| *H04B 1/18* | (2006.01) |

(52) U.S. Cl.
CPC ............. *H01Q 5/335* (2015.01); *H01Q 1/48* (2013.01); *H01Q 9/0442* (2013.01); *H04B 1/18* (2013.01)

(58) Field of Classification Search
CPC ........ H01Q 5/335; H01Q 1/48; H01Q 9/0442; H01Q 5/364; H01Q 9/0414; H01Q 21/24; H01Q 9/0457; H01Q 1/36; H01Q 1/50; H01Q 5/20; H01Q 5/307; H04B 1/18
USPC ........................................................ 343/860
See application file for complete search history.

(56) References Cited

U.S. PATENT DOCUMENTS

| | | |
|---|---|---|
| 5,786,793 A | 7/1998 | Maeda et al. |
| 5,801,660 A | 9/1998 | Ohtsuka et al. |
| 9,099,790 B2 | 8/2015 | Chen et al. |

(Continued)

FOREIGN PATENT DOCUMENTS

| | | |
|---|---|---|
| CN | 103904417 A | 7/2014 |
| TW | 201622248 A | 6/2016 |

*Primary Examiner* — Jean B Jeanglaude
(74) *Attorney, Agent, or Firm* — Li & Cai Intellectual Property (USA) Office

(57) ABSTRACT

An electronic device and an antenna structure thereof are provided. The antenna structure includes a first radiating member, a feeding member disposed on the first radiating member, a second radiating member, and a grounding member. A first predetermined gap is between the feeding member and the first radiating member. The feeding member, the first predetermined gap, and the first radiating member resonate to generate a low frequency band and a high frequency band. The second radiating member including a main body and a grounding part is disposed on the first radiating member. A second predetermined gap is between the main body and the first radiating member. The grounding part, the main body, and the second predetermined gap resonate to increase a bandwidth of the low frequency band. The grounding member is disposed on the first radiating member and electrically connected to the grounding part.

15 Claims, 15 Drawing Sheets

(56) References Cited

U.S. PATENT DOCUMENTS

| | | |
|---|---|---|
| 9,673,512 B2 | 6/2017 | Lin |
| 10,297,927 B2 | 5/2019 | Amadjikpe |
| 2005/0110686 A1 | 5/2005 | Frederik du Toit |
| 2008/0088510 A1* | 4/2008 | Murata .................... H01Q 3/24 343/876 |
| 2012/0001815 A1* | 1/2012 | Wong ................... H01Q 9/0421 343/843 |
| 2014/0009361 A1* | 1/2014 | Kato ........................ H01Q 9/40 343/860 |
| 2014/0191918 A1* | 7/2014 | Cheng ................. H01Q 21/205 343/834 |

* cited by examiner

ELECTRONIC DEVICE AND ANTENNA STRUCTURE THEREOF

CROSS-REFERENCE TO RELATED PATENT APPLICATION

This application claims the benefit of priority to Taiwan Patent Application No. 108147531, filed on Dec. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNOLOGY FIELD

The present disclosure relates to an antenna structure, and more particularly to an electronic device and an antenna structure thereof having dual bandwidth broadband.

BACKGROUND

Firstly, with the development of 5th Generation Mobile Networks (5G) technology, broadband antennas have higher demands for the characteristics. In terms of the current 5G new radio (NR) frequency bands, the frequency range of the n257 band is between 26.5 GHz and 29.5 GHz, and the frequency range of the n260 band is between 37 GHz and 40 GHz. However, since the frequency of the n257 band is close to that of the n260 band, designing a broadband antenna structure encompassing both the n257 band and the n260 band is relatively difficult.

A conventional method utilizes dual feeds to generate two 5G frequency bands. It has become an important matter for the industry to overcome the above inadequacies by utilizing a single feed to generate two 5G frequency bands for an antenna.

SUMMARY OF THE DISCLOSURE

In response to the above-referenced technical inadequacies, the present disclosure provides an electronic device and an antenna structure thereof.

In one aspect, the present disclosure provides an antenna structure including a first radiating member, a feeding member, a second radiating member, and a grounding member. The feeding member is disposed on a first side of the first radiating member. A first predetermined gap is between the feeding member and the first radiating member. The feeding member, the first predetermined gap, and the first radiating member resonate to generate a low frequency band and a high frequency band. The second radiating member is disposed on a second side opposite to the first side of the first radiating member. The second radiating member includes a main body and a grounding part. A second predetermined gap is between the main body and the first radiating member. The grounding part, the main body, and the second predetermined gap resonate to increase a bandwidth of the low frequency band. The grounding member is disposed on the first side of the first radiating member, and the grounding part is electrically connected to the grounding member.

In another aspect, the present disclosure provides an electronic device including a plurality of antenna arrays, a plurality of signal sources, and a radio frequency chip. Each of the antenna arrays includes two adjacent antenna structures in different polarization directions, respectively. Each of the two antenna structures includes a first radiating member, a feeding member, a second radiating member, and a grounding member. The feeding member is disposed on a first side of the first radiating member. A first predetermined gap is between the feeding member and the first radiating member. The feeding member, the first predetermined gap, and the first radiating member resonate to generate a low frequency band and a high frequency band. The second radiating member is disposed on a second side opposite to the first side of the first radiating member. The second radiating member includes a main body and a grounding part. A second predetermined gap is between the main body and the first radiating member. The grounding part, the main body, and the second predetermined gap resonate to increase a bandwidth of the low frequency band. The grounding member is disposed on the first side of the first radiating member, and the grounding part is electrically connected to the grounding member. Each of the signal sources corresponds to a corresponding one of the antenna structures. Each of the signal sources includes a feeding end and a grounding end. The feeding end is electrically connected to the feeding member of a corresponding one of the antenna structures, and the grounding end is electrically connected to the grounding member of a corresponding one of the antenna structures. The radio frequency chip is electrically connected to the signal sources.

One of the beneficial effects of the electronic device and the antenna structure thereof of the present disclosure is that, impedance matching between a first operating frequency band and a second operating frequency band is improved by virtue of "the feeding member" and "a first predetermined gap between the feeding member and the first radiating member". In addition, the bandwidth of the low frequency band is increased by virtue of "a second predetermined gap defined between the main body and the first radiating member" and "a path that electrically connects the second radiating member with the grounding member", such that an impedance bandwidth of the antenna structure having a single feed is increased and that the impedance matching is enhanced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

First Embodiment

Figure 1:
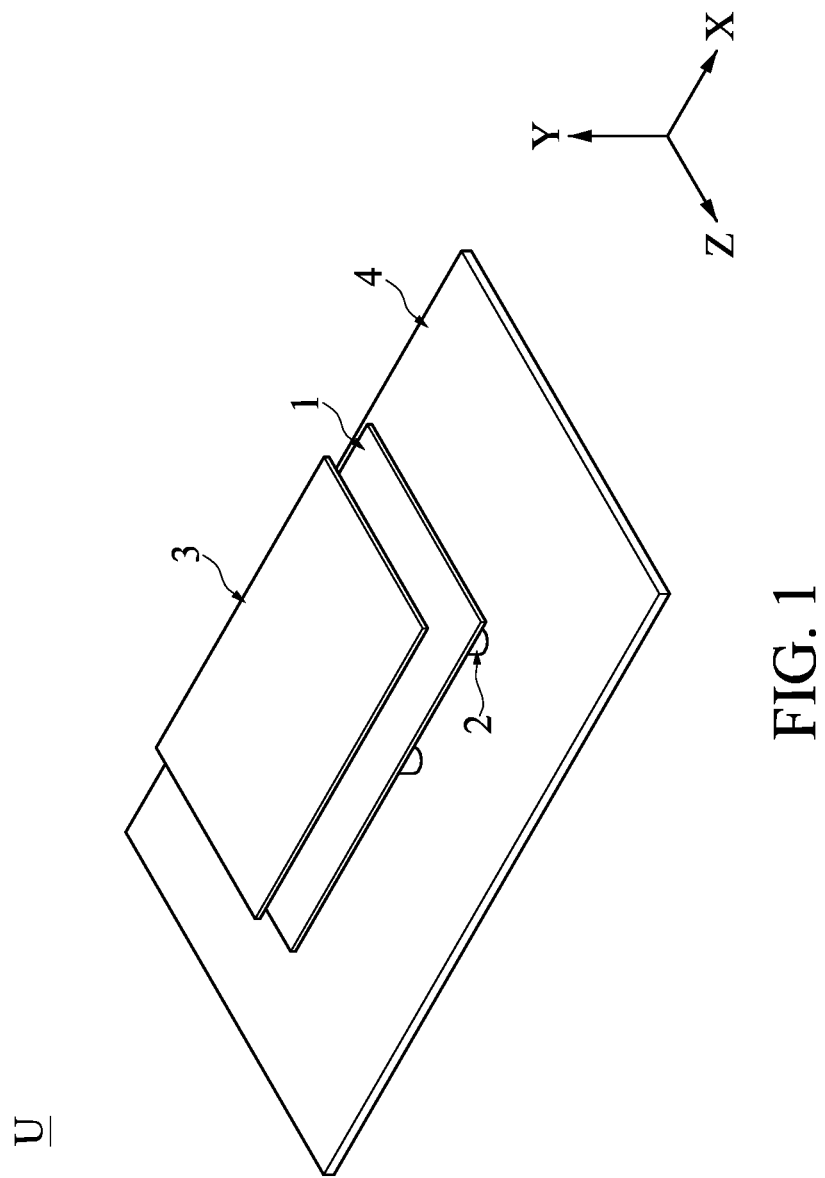
FIG. 1 is a perspective schematic view of an antenna structure in a first embodiment of the present disclosure.

References are made to FIG. 1 to FIG. 4, which are perspective schematic views of an antenna structure in a first embodiment of the present disclosure. An antenna structure U is provided by the present disclosure, and an overall structure of the antenna structure U is illustrated in the first embodiment. An electronic device D utilizing the antenna structure U is also provided by the present disclosure, and a structure of the electronic device D is illustrated in the following embodiment.

The antenna structure U includes a first radiating member 1, a feeding member 2, a second radiating member 3, and a grounding member 4. For example, the antenna structure U of the present disclosure may be a patch antenna, and the second radiating member 3, the first radiating member 1, the feeding member 2, and the grounding member 4 may be respective metal layers that are disposed on a multi-layer board structure and stacked sequentially upon one another, but the present disclosure is not limited thereto.

Moreover, the first radiating member 1 includes a first side and a second side opposite to the first side, and the first side and the second side are positioned on two diagonally opposite sides of the first radiating member 1. The feeding member 2 is disposed on the first side of the first radiating member 1, and the feeding member 2 and the first radiating member 1 are separate from each other and there exists a first predetermined gap C1 in between. In addition, the grounding member 4 may be disposed on the first side of the first radiating member 1, and the feeding member 2 is disposed between the first radiating member 1 and the grounding member 4. Therefore, the feeding member 2, the first predetermined gap C1, and the first radiating member 1 resonate to generate a first operating frequency band (i.e., a low frequency band) with a frequency range between 26.4 GHz and 31.5 GHz, and generate a second operating frequency band (i.e., a high frequency band) with another frequency range between 33.1 GHz and 40.5 GHz. That is to say, the frequency range of the low frequency band encompasses a 28 GHz frequency band, and the frequency range of the high frequency band encompasses a 39 GHz frequency band. However, it should be noted that the above-mentioned example of the frequency ranges is only one of the feasible embodiments, and the present disclosure is not limited thereto.

For example, the first radiating member 1 may be a rectangular sheet structure, such as a sheet structure in a shape of a rectangle, and the length of the first radiating member 1 may be, for example, but not limited to, 2.5 millimeters (mm), the width of the first radiating member 1 may be, for example, but not limited to, 1.6 mm, and a thickness of the first radiating member 1 may be, for example, but not limited to, 0.015 mm Therefore, for example, when the first radiating member 1 is in a shape of a rectangle, the first radiating member 1 may have a long side 101 and a short side 102. The long side 101 of the first radiating member 1 is used to resonate to generate a first operating frequency band having a frequency range between 26.4 GHz and 31.5 GHz. The short side 102 of the first radiating member 1 is used to resonate to generate a second operating frequency band having a frequency range between 33.1 GHz and 40.5 GHz. In addition, for example, the first predetermined gap C1 may be between 0.05 mm and 0.15 mm, but the present disclosure is not limited thereto. In addition, it is worth mentioning that the first side and the second side described herein are two opposite sides of a plane formed by the long side 101 and the short side 102 of the first radiating member 1.

Figure 2:
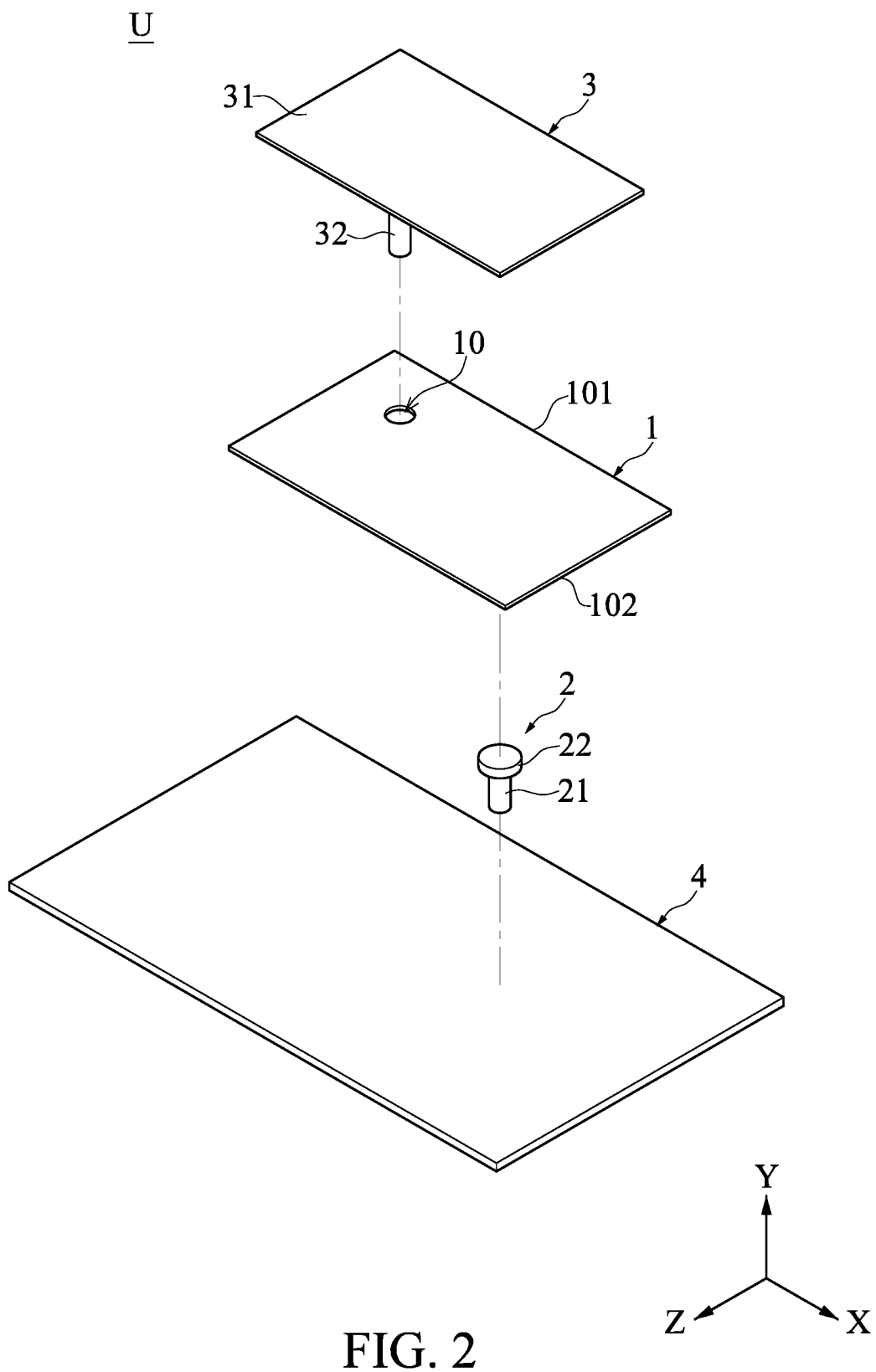
FIG. 2 is an exploded perspective schematic view of the antenna structure in the first embodiment of the present disclosure.
Figure 4:
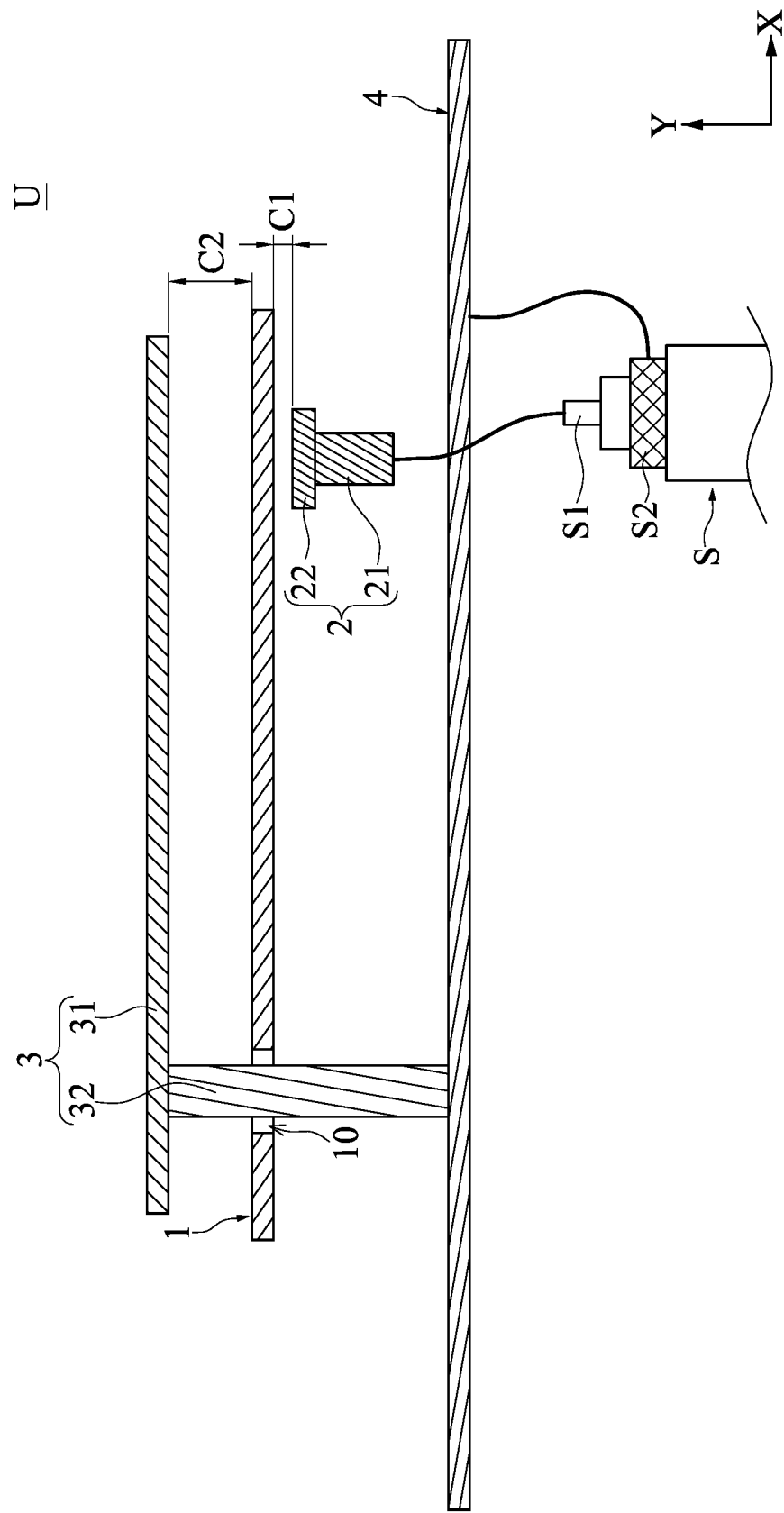
FIG. 4 is a front schematic view of the antenna structure in the first embodiment of the present disclosure.

Referring to FIG. 2 and FIG. 4, the feeding member 2 includes a feeding part 21 and a coupling part 22 electrically connected to the feeding part 21. The coupling part 22 and the first radiating member 1 are separate from each other and the first predetermined gap C1 is between the coupling part 22 and the first radiating member 1. In addition, a signal source S may be connected to the feeding member 2 of the antenna structure U to feed radio frequency signals. More specifically, the signal source S includes a feeding end S1 and a grounding end S2. The feeding end S1 is electrically connected to the feeding part 21 of the feeding member 2, and the grounding end S2 is electrically connected to the grounding member 4. In addition, for example, the signal source S may be a coaxial cable, but the present disclosure is not limited thereto. The present disclosure is illustrated by exemplifying the coupling part 22 of the feeding member 2 as a circle; however, in another embodiment, the coupling part 22 may also be in other shapes, for example, but not limited to, a rectangle, and the present disclosure is not limited thereto.

Referring to FIG. 1, FIG. 2 and FIG. 4, the second radiating member 3 is disposed on the second side of the first radiating member 1, so that the first radiating member 1 is located between the feeding member 2 and the second radiating member 3. Furthermore, the second radiating member 3 includes a main body 31 and a grounding part 32. The main body 31 and the first radiating member 1 are separate from each other and a second predetermined gap C2 is between the main body 31 and the first radiating member 1. In addition, for example, the second radiating member 3 may be a rectangular sheet structure, such as a sheet structure in a shape of a rectangle, and the length of the second radiating member 3 may be, for example, but not limited to, 2.5 mm, the width of the second radiating member 3 may be, for example, but not limited to, 1.6 mm, and a thickness of the second radiating member 3 may be, for example, but not limited to, 0.015 mm. In other words, the shape and the size of the second radiating member 3 may be the same as that of the first radiating member 1, but the present disclosure is not limited thereto. In addition, it should be noted that, in order to elaborate the relative positions of the first radiating member 1 and the second radiating member 3, the shape and the size of the second radiating member 3 shown in the figures are different from that of the first radiating member 1 as examples. In addition, for example, the second predetermined gap C2 may be between 0.15 mm and 0.25 mm, but the present disclosure is not limited thereto. It should be noted that, for example, the above-mentioned grounding part 32 and the feeding part 21 may be electrically conductive parts for connecting the metal layers in the multi-layer board.

In addition, further referring to FIG. 2 and FIG. 4, the first radiating member 1 further has an opening 10, and the opening 10 is formed on the first radiating member 1 and goes through the first radiating member 1. Therefore, the grounding part 32 of the second radiating member 3 may be electrically connected to the grounding member 4 through the opening 10. For example, a diameter of the opening 10 may be 0.4 mm, and a diameter of the grounding part 32 may be 0.2 mm Therefore, the grounding part 32 and the first radiating member 1 may be prevented from contacting each other, thereby preventing the first radiating member 1 from being grounded.

Figure 3:
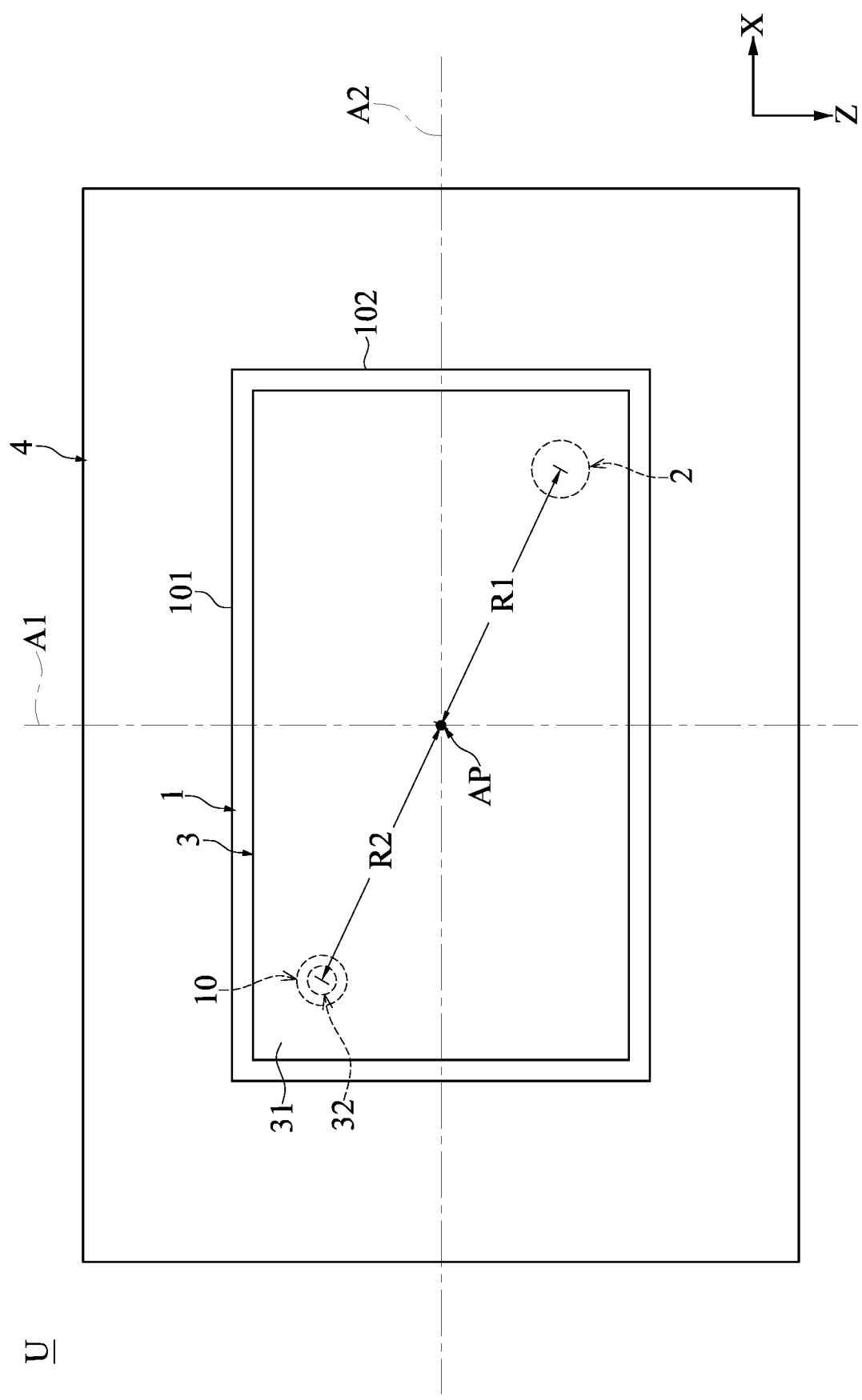
FIG. 3 is a top schematic view of the antenna structure in the first embodiment of the present disclosure.

Referring to FIG. 3, an orthographic projection of the coupling part 22 of the feeding member 2 onto the first radiating member 1 and the orthographic projection of the grounding part 32 onto the first radiating member 1 are located at two diagonally opposite corners of the first radiating member 1. Furthermore, the first radiating member 1 has a first central axis A1 perpendicular to the long side 101 and a second central axis A2 perpendicular to the short side 102. The first central axis A1 and the second central axis A2 are perpendicular to each other, and the first central axis A1 and the second central axis A2 intersect with each other at a symmetry center AP of the first radiating member 1.

For example, a first predetermined distance R1 is a distance between the orthographic projection of the coupling part 22 of the feeding member 2 onto the first radiating member 1 and the symmetry center AP, and the first predetermined distance R1 substantially equals to 0.14 times to 0.16 times of a wavelength corresponding to a central frequency of the antenna structure U operating in the first operating frequency band. In addition, a second predetermined distance R2 is a distance between the orthographic projection of the grounding part 32 onto the first radiating member 1 and the symmetry center AP. The second predetermined distance R2 substantially equals to 0.17 times to 0.19 times of the wavelength corresponding to the central frequency of the antenna structure U operating in the first operating frequency band. However, it should be noted that the present disclosure is not limited to the above-mentioned examples. In addition, for example, the first predetermined distance R1 is substantially 0.8 mm to 0.9 mm, and the second predetermined distance R2 is substantially 0.9 mm to 1.1 mm, but the present disclosure is not limited thereto.

Furthermore, in terms of the antenna structure U of the present disclosure, the radio frequency signals fed by the signal source S go through a path formed by the feeding part 21 and the coupling part 22 of the feeding member 2, and generate resonant coupling with the first predetermined gap C1 between the coupling part 22 and the first radiating member 1 to form a series LC resonant structure. An area of the coupling part 22 may determine an inductance of the series LC resonant structure, and the first predetermined gap C1 may determine a capacitance of the series LC resonant structure. Therefore, the impedance matching of the first operating frequency band and the second operating frequency band may be adjusted by changing the size of the area of the coupling part 22 and/or the first predetermined gap C1 between the coupling part 22 and the first radiating member 1. On the other hand, in one embodiment of the present disclosure, another LC resonant structure may be formed by a path and the second predetermined gap C2, wherein the path is formed by the grounding member 4 passing through the grounding part 32 of the second radiating member 3 and the main body 31 of the second radiating member 3, and generates resonant coupling with the second predetermined gap C2 between the first radiating member 1 and the main body 31. The grounding part 32, the main body 31, and the second predetermined gap C2 resonate to increase a bandwidth of the low frequency band. In addition, the second predetermined gap C2 may also determine the capacitance of the another LC resonant structure, thereby increasing the bandwidth of the first operating frequency band. A person ordinarily skilled in the art may adjust the bandwidth of the first operating frequency band by changing the grounding part 32 of the second radiating member 3 and/or the second predetermined gap C2.

Figure 5:
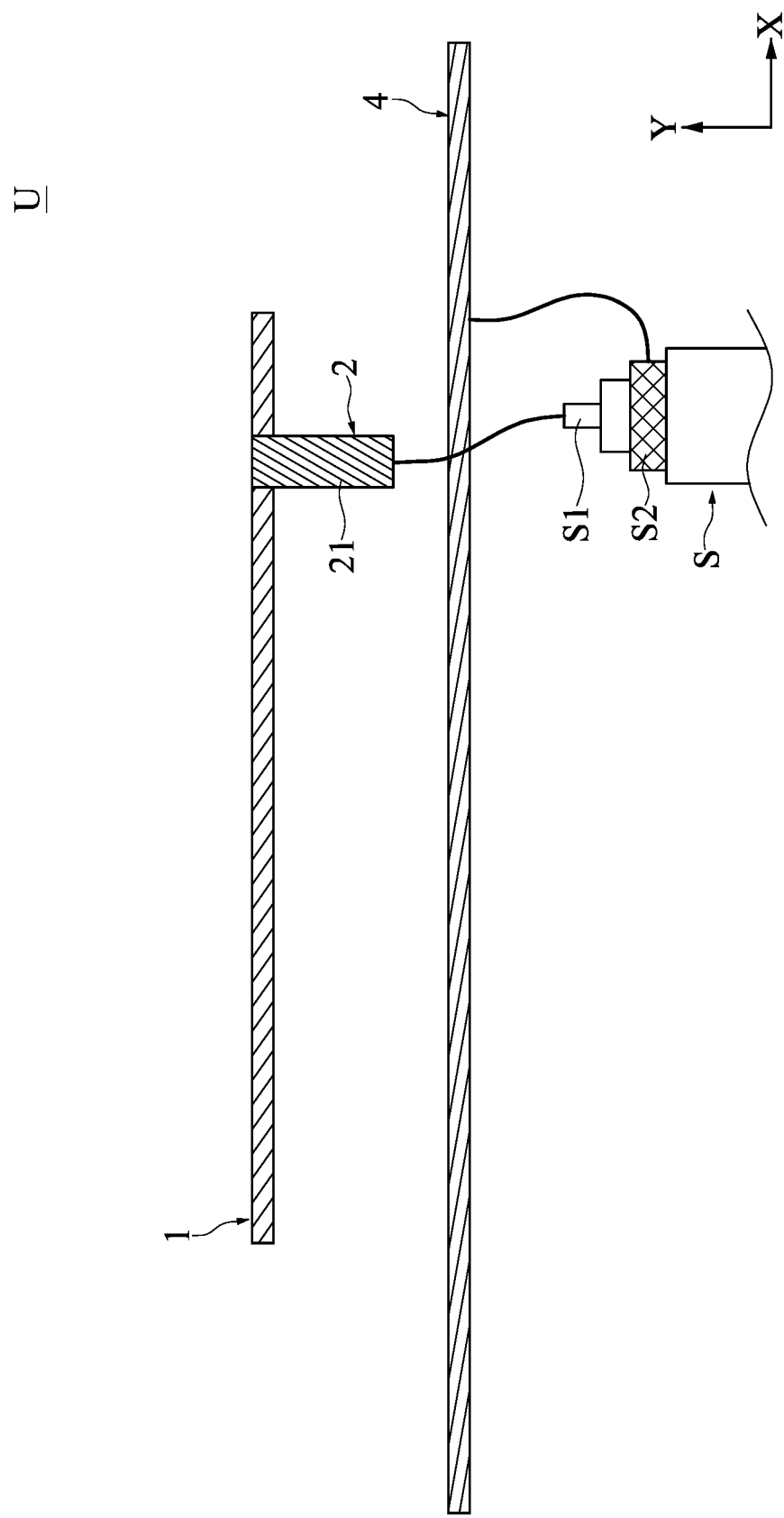
FIG. 5 is a front schematic view of another antenna structure in the first embodiment of the present disclosure.
Figure 6:
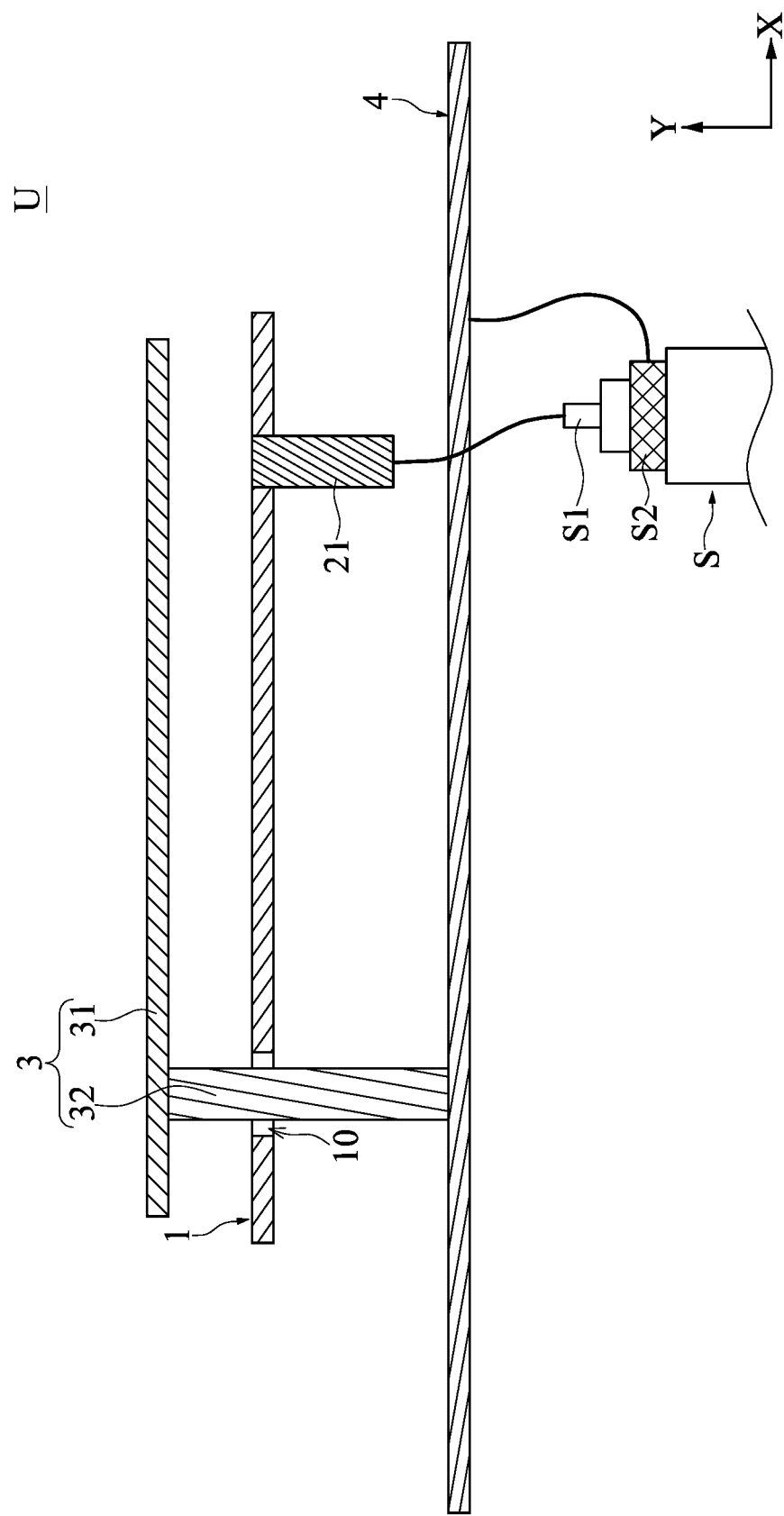
FIG. 6 is a front schematic view of yet another antenna structure in the first embodiment of the present disclosure.
Figure 7:
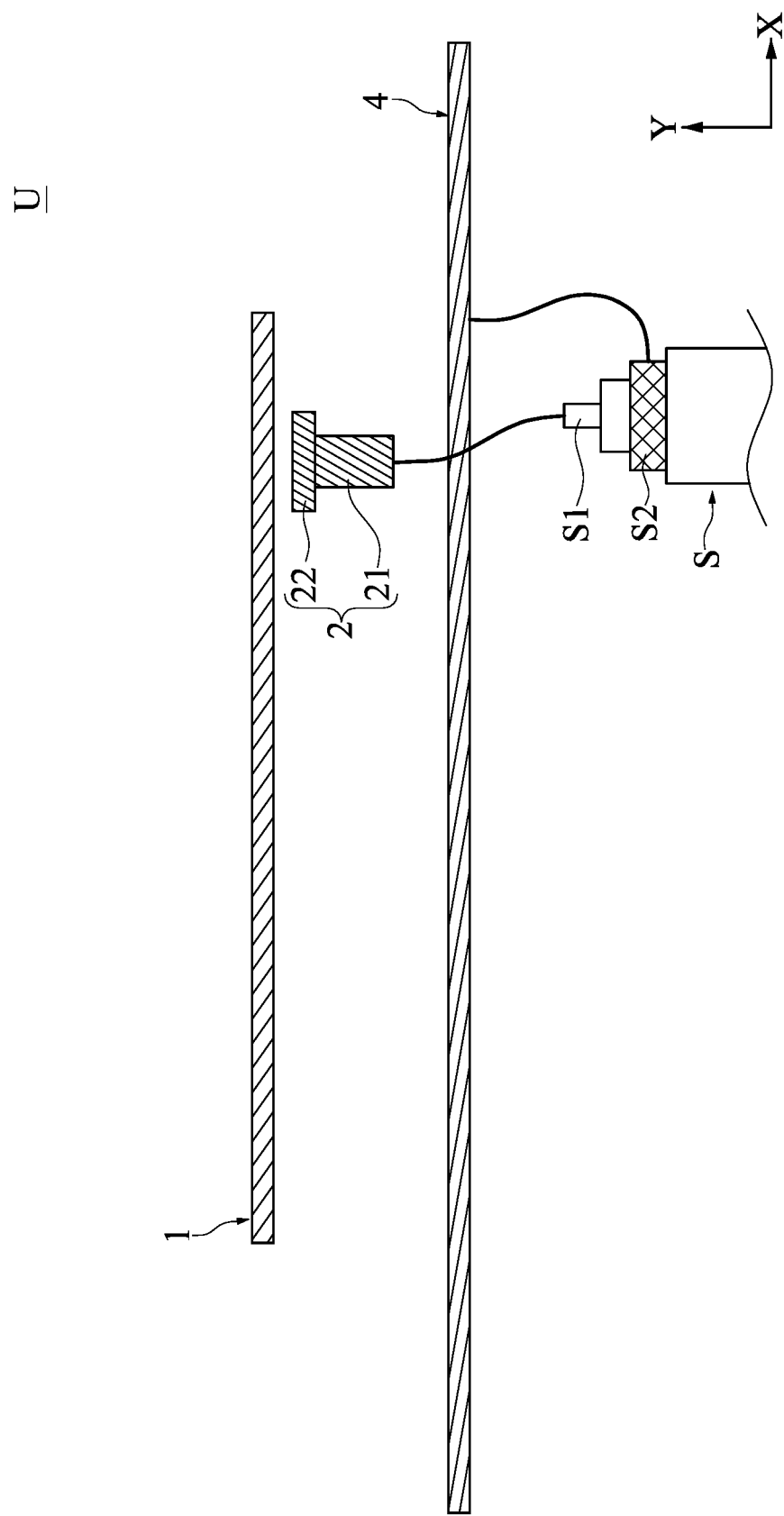
FIG. 7 is a front schematic view of still another antenna structure in the first embodiment of the present disclosure.
Figure 8:
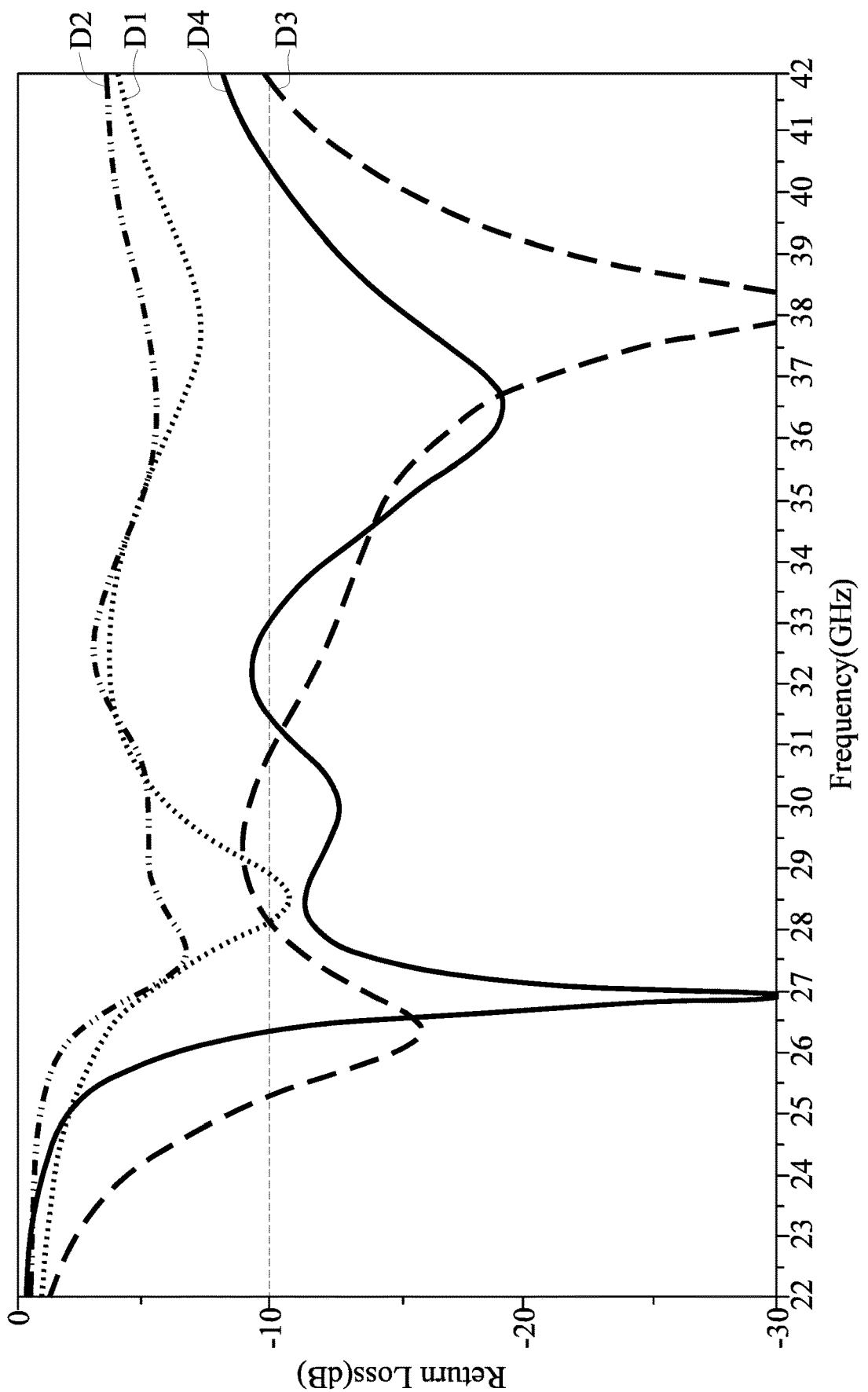
FIG. 8 is a plot of return loss vs. frequency for the antenna structures shown in FIG. 4, FIG. 5, FIG. 6, and FIG. 7.

References are made to FIG. 4 to FIG. 8, FIG. 5 to FIG. 7 are front schematic views of the antenna structures in other implementations of the present disclosure. FIG. 8 is a plot of return loss vs. frequency for the antenna structures shown in FIG. 4, FIG. 5, FIG. 6, and FIG. 7. In FIG. 8, the curve D1 represents return loss for the antenna structure U shown in FIG. 5, the curve D2 represents return loss curve for the antenna structure U shown in FIG. 6; the curve D3 represents return loss curve for the antenna structure U shown in FIG. 7; and the curve D4 represents return loss curve for the antenna structure U shown in FIG. 4. FIG. 5 shows an implementation by which only the feeding part 21 is used to directly feed radio frequency signals to the first radiating member 1. Therefore, as shown in FIG. 8, the impedance matching at 28 GHz and 39 GHz in the implementation shown in FIG. 5 has bad performance. FIG. 6 shows an implementation by which the feeding part 21 directly feeds radio frequency signals to the first radiating member 1, in cooperation with the path formed by the grounding member 4, the grounding part 32, and the main body 31, and generates resonant coupling with the second predetermined gap C2 between the first radiating member 1 and the main body 31. Therefore, as shown in FIG. 8, the impedance matching at 28 GHz and 39 GHz for the implementation shown in FIG. 6 has bad performance and an additional resonance frequency band is generated at 30.5 GHz. FIG. 7 is an implementation by which the feeding part 21 is used to feed radio frequency signals to the coupling part 22, and the coupling part 22 and the first radiating member 1 have resonant coupling. Therefore, as shown in FIG. 8, the impedance matching at 28 GHz and 39 GHz for the implementation shown in FIG. 7 may have return loss below −10 dB, an impedance bandwidth is 10.7% at 28 GHz, and the impedance bandwidth is 29.9% at 39 GHz. As shown in FIG. 4, FIG. 4 is the antenna structure U in one embodiment of the present disclosure. Therefore, as shown in FIG. 8, the impedance matching at 28 GHz and 39 GHz for the implementation shown in FIG. 4 may have return loss below −10 dB, the impedance bandwidth is 17.8% at 28 GHz, and the impedance bandwidth is 20.1% at 39 GHz. Accordingly, as shown in Table 1, Table 1 is a comparison of the bandwidth (along with a corresponding first frequency point and a corresponding second frequency point) when the return loss of the antenna structures U shown in FIG. 4 and FIG. 7 is below −10 dB.

Figure 12:
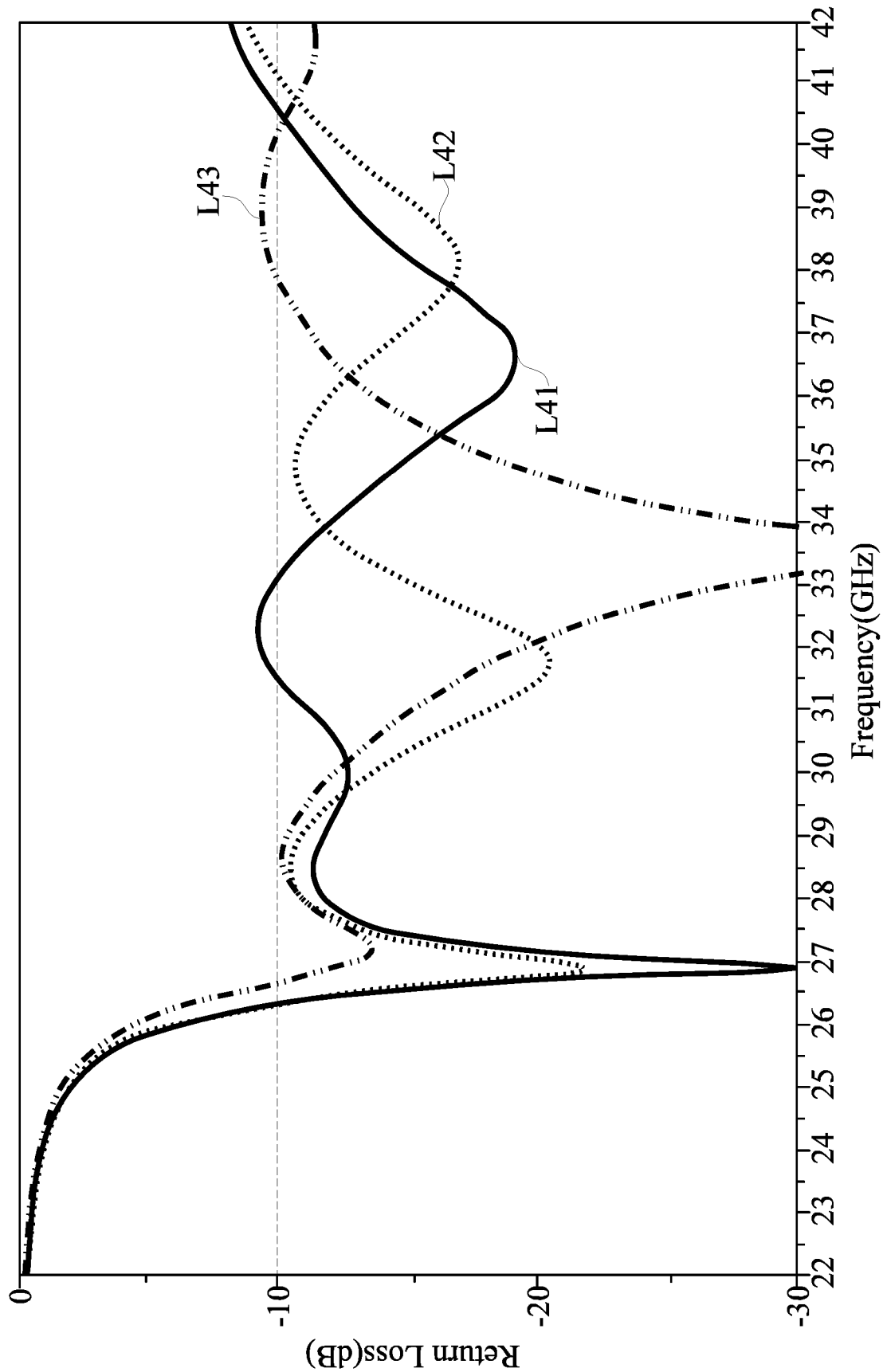
FIG. 12 is still another plot of return loss vs. frequency for the antenna structures in the first embodiment of the present disclosure.

As shown in FIG. 12, FIG. 12 is a plot of return loss vs. frequency for the antenna structures U with different areas of the second radiating member 3. In one embodiment of the present disclosure, the impedance matching may be adjusted by adjusting the area of the second radiating member 3. The curve L41 represents that the size of the area of the second

TABLE 1

| Implementation in FIG. 4/ FIG. 7 | Frequency band | First frequency point (f1) | Second frequency point (f2) | Bandwidth (f2 − f1) | Central frequency (f2 − f1)/ 2 | Bandwidth percentage (bandwidth/ central frequency) |
| --- | --- | --- | --- | --- | --- | --- |
| FIG. 4 | 28 GHz | 26.4 GHz | 31.5 GHz | 5.2 | 28.9 | 17.8% |
|  | 39 GHz | 33.1 GHz | 40.5 GHz | 7.4 | 36.8 | 20.1% |
| FIG. 7 | 28 GHz | 25.3 GHz | 28.2 GHz | 2.9 | 26.7 | 10.7% |
|  | 39 GHz | 31.0 GHz | 41.9 GHz | 10.9 | 36.4 | 29.9% |

Figure 9:
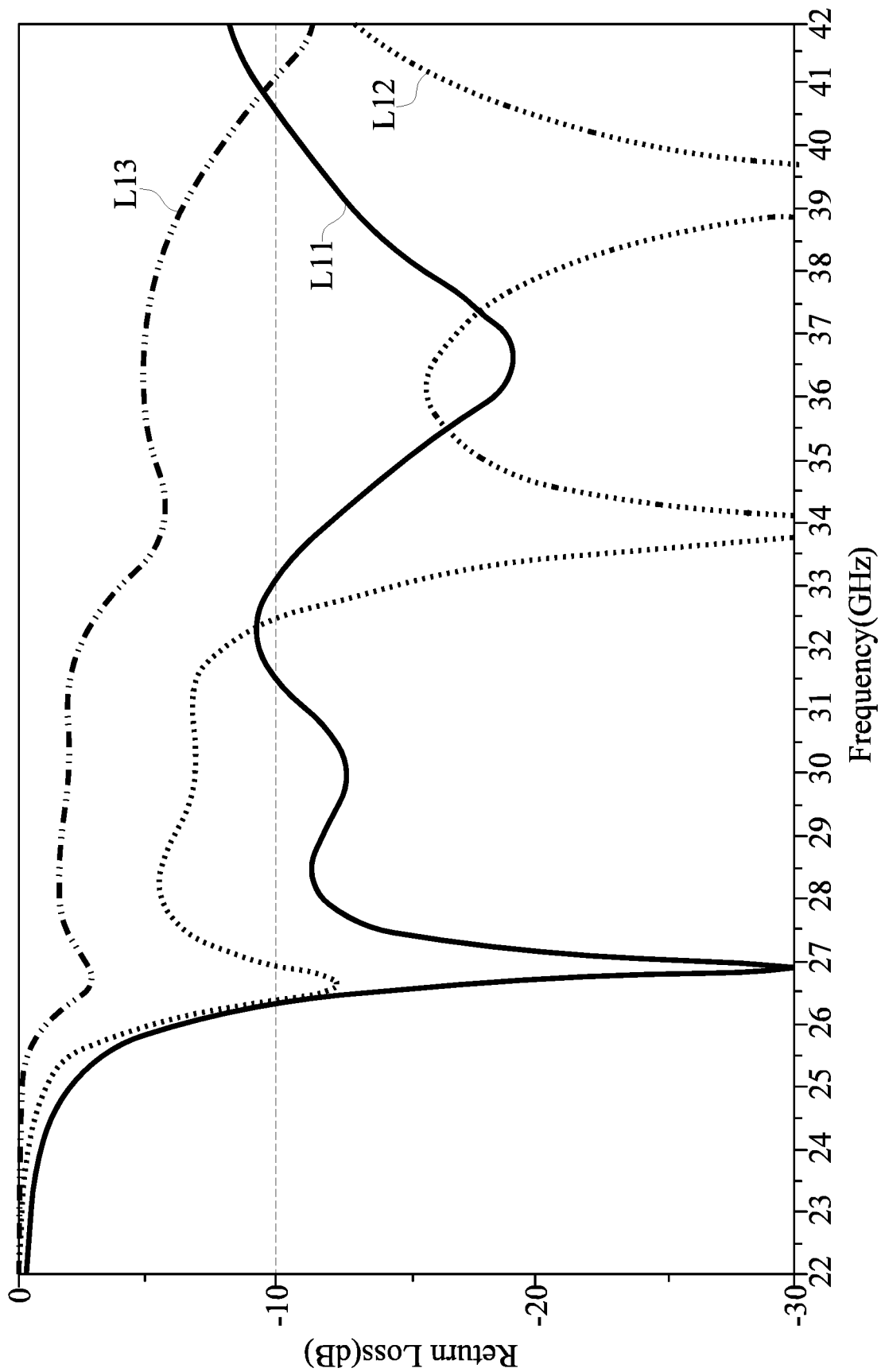
FIG. 9 is a plot of return loss vs. frequency for the antenna structures in the first embodiment of the present disclosure.

References are made to FIG. 9 to FIG. 12, which are plots of the return losses vs. frequency for the antenna structures in the first embodiment of the present disclosure. The impact of the length of each path on the return losses of the antenna structures U will be further described below. As shown in FIG. 9, FIG. 9 is a plot of return losses vs. frequency for the antenna structures U with different areas (diameters) of the coupling part 22. The curve L11 represents that a diameter of the coupling part 22 is 0.4 mm; the curve L12 represents that the diameter of the coupling part 22 is 0.3 mm; and the curve L13 represents that the diameter of the coupling part 22 is 0.2 mm. In one embodiment of the present disclosure, the inductance of the series LC resonant structure may be adjusted through adjusting the diameter of the coupling part 22. As shown in FIG. 9, when the diameter of the coupling part 22 is 0.4 mm, the antenna structure U has improved impedance matching in the first operating frequency band and the second operating frequency band, but the present disclosure is not limited thereto.

Figure 10:
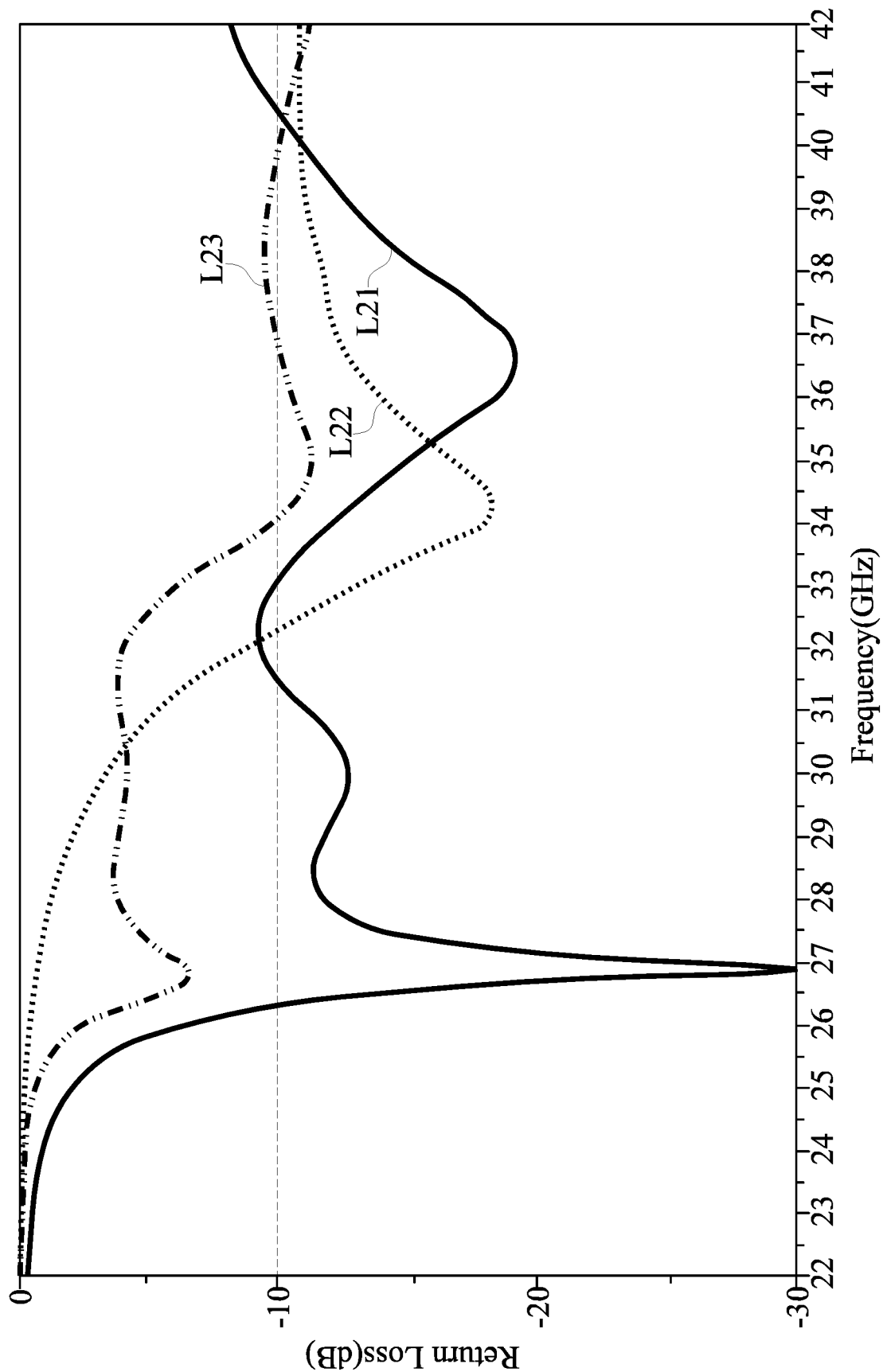
FIG. 10 is another plot of return loss vs. frequency for the antenna structures in the first embodiment of the present disclosure.

As shown in FIG. 10, FIG. 10 is a plot of return loss vs. frequency for the antenna structure U with different sizes of the first predetermined gaps C1. In one embodiment of the present disclosure, the capacitance of the series LC resonant structure may be adjusted by adjusting the size of the first predetermined gap C1. The curve L21 represents that the first predetermined gap C1 is 0.1 mm; the curve L22 represents that the first predetermined gap C1 is 0.15 mm; and the curve L23 represents the first predetermined gap C1 is 0.2 mm. As shown in FIG. 10, when the first predetermined gap C1 is 0.1 mm, the antenna structure U has an improved impedance matching in the first operating frequency band and the second operating frequency band, but the present disclosure is not limited thereto.

Figure 11:
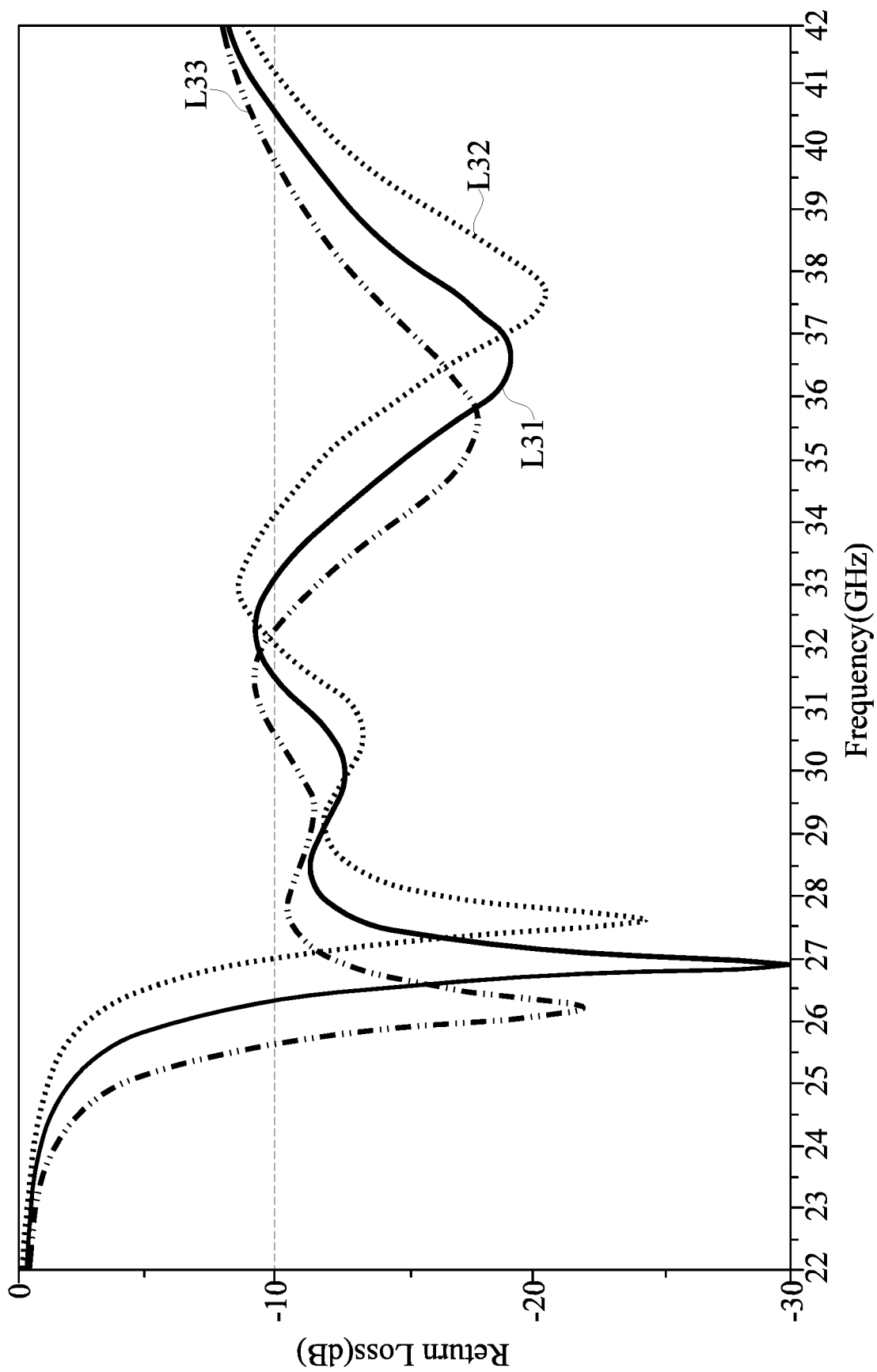
FIG. 11 is yet another plot of return loss vs. frequency for the antenna structures in the first embodiment of the present disclosure.

As shown in FIG. 11, FIG. 11 is a plot of return loss vs. frequency for the antenna structures U with different sizes of the second predetermined gaps C2. In one embodiment of the present disclosure, the impedance matching may be adjusted by adjusting the size of the second predetermined gap C2. The curve L31 represents that the second predetermined gap C2 is 0.2 mm; the curve L32 represents that the second predetermined gap C2 is 0.15 mm; and the curve L33 represents that the second predetermined gap C2 is 0.25 mm. As shown in FIG. 11, when the second predetermined gap C2 is 0.2 mm, the antenna structure U has an improved impedance matching in the first operating frequency band and the second operating frequency band, but the present disclosure is not limited thereto.

radiating member 3 is 2.4 mm×1.6 mm; the curve L42 represents that the size of the area of the second radiating member 3 is 2.2 mm×1.4 mm; and the curve L43 represents that the size of the area of the second radiating member 3 is 1.8 mm×1.0 mm. As shown in FIG. 12, when the area of the second radiating member 3 is 2.4 mm×1.6 mm, the antenna structure U has an improved impedance matching in the first operating frequency band and the second operating frequency band, but the present disclosure is not limited thereto.

Second Embodiment

Figure 13:
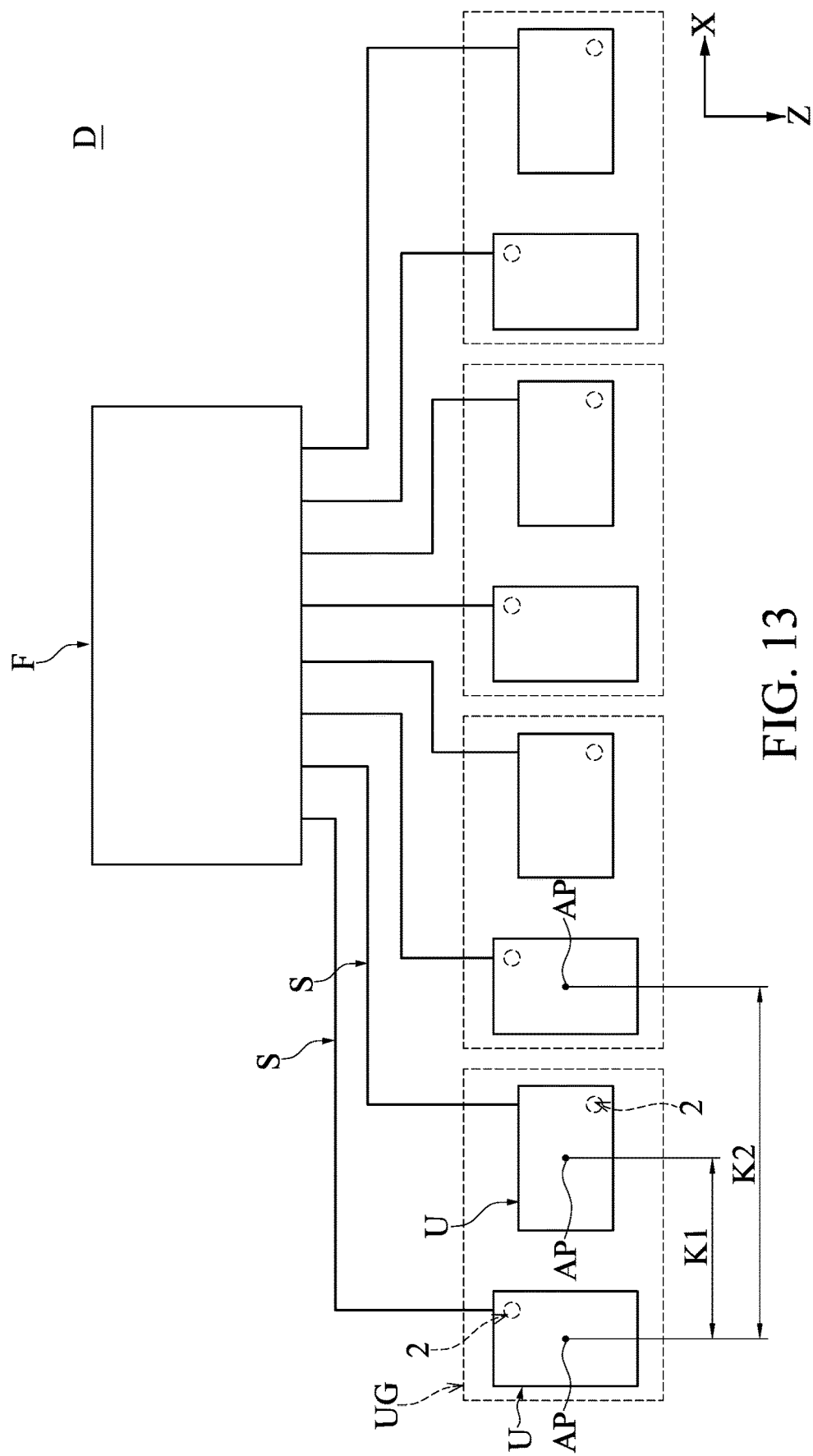
FIG. 13 is a functional block diagram of an electronic device in a second embodiment of the present disclosure.
Figure 14:
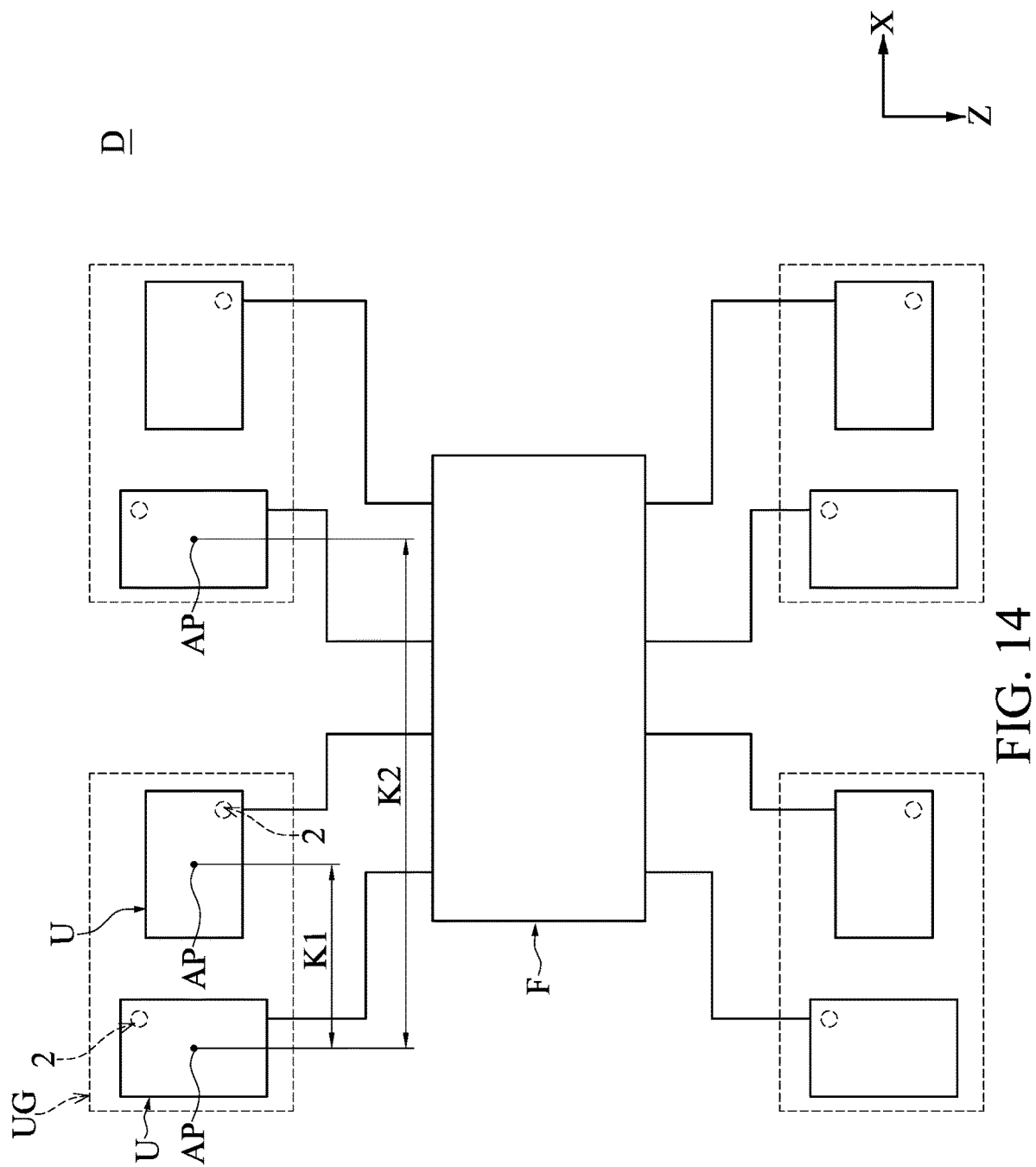
FIG. 14 is another functional block diagram of the electronic device in the second embodiment of the present disclosure.

Firstly, references are made to FIG. 13 and FIG. 14, which are functional block diagrams of an electronic device in a second embodiment of the present disclosure. The second embodiment of the present disclosure provides an electronic device D including a plurality of antenna arrays UG, a plurality of signal sources S, and a radio frequency (RF) chip F. In the present disclosure, the electronic device D includes at least two adjacent antenna structures U in different polarization directions, and the two adjacent antenna structures U in different polarization directions may form one of the antenna arrays UG in the electronic device D. That is, each of the antenna arrays UG includes two adjacent antenna structures U in different polarization directions. The implementation shown in FIG. 13 is a 1×4 antenna array, and the implementation shown in FIG. 14 is a 2×2 antenna array. However, it should be noted that in other implementations, antenna arrays in any other forms may also be utilized according to practical requirements, and the present disclosure is not limited in the form of the antenna array.

Furthermore, each of the antenna structures U includes a first radiating member 1, a feeding member 2, a second radiating member 3 and a grounding member 4. In addition, it should be noted that the structure of the antenna structures U in the electronic device D provided in the second embodiment is similar to that of the antenna structure U in the first embodiment, and will not be reiterated herein. Therefore, as described in the first embodiment, each of the antenna structures U may generate a first operating frequency band with a frequency range between 26.4 GHz and 31.5 GHz and a second operating frequency band with a frequency range between 33.1 GHz and 40.5 GHz.

As mentioned above, each of the signal sources S corresponds to a corresponding g antenna structures U, and a feeding end S1 of each signal sources S is electrically connected to the feeding member 2 of the corresponding antenna structures U, and a grounding end S2 of each signal sources S is electrically connected to the grounding member 4 of the corresponding antenna structures U. In addition, the RF chip F is electrically connected to the signal sources S. For example, the RF chip F may be a radio frequency front-end (RF front-end) chip, but the present disclosure is not limited thereto.

Next, references are further made to FIG. 13 and FIG. 14. The positional relation between the two adjacent antenna structures U in different polarization directions in each of the antenna arrays UG will be further described below. More specifically, the polarization directions of one of the two adjacent antenna structures U and the other one of the two adjacent antenna structures U in each antenna array UG may be orthogonal to each other. For example, the two adjacent antenna structures U in each antenna array UG may be arranged along two predetermined directions (for example, but not limited to, the X axis and the Y axis), and the length direction of one of the two adjacent antenna structures U and the length direction of the other one of the two adjacent antenna structures U are perpendicular to each other.

According to the above, each of the two adjacent antenna structures U may define a symmetry center AP. A first electrical length K1 is a distance between the symmetry centers AP of the two adjacent antenna structures U, and the first electrical length K1 is between 0.25 times and 0.35 times of a wavelength corresponding to a central frequency of each adjacent antenna structure U operating in the first operating frequency band, but the present disclosure is not limited thereto. For example, the first electrical length K1 may be substantially between 3 mm and 4 mm, but the present disclosure is not limited thereto. In the present disclosure, the first electrical length K1 is exemplified as 0.3 times the wavelength corresponding to the central frequency of each antenna structure U operating in the first operating frequency band.

For example, one of the two adjacent antenna structures U (e.g., the antenna structure U on the left of the antenna array UG illustrated in FIG. 13 and FIG. 14) may generate the second operating frequency band (high frequency band) with the frequency range between 33.1 GHz and 40.5 GHz in a horizontal polarization direction, and generate the first operating frequency band (low frequency band) with the frequency range between 26.4 GHz and 31.5 GHz in a vertical polarization direction. In addition, the other one of the two adjacent antenna structures U (e.g., the antenna structure U on the right of the antenna array UG illustrated in FIG. 13 and FIG. 14) may generate the first operating frequency band with the frequency range between 26.4 GHz and 31.5 GHz in the horizontal polarization, and generate the second operating frequency band with the frequency range between 33.1 GHz and 40.5 GHz in the vertical polarization direction. However, the present disclosure is not limited to the afore-mentioned examples.

References are further made to FIG. 13 and FIG. 14. It is worth noting that a second electrical length K2 may be between two adjacent antenna arrays UG, and the second electrical length K2 is between 0.5 times and 0.7 times of the wavelength corresponding to the central frequency of each antenna structure U operating in the first operating frequency band, but the present disclosure is not limited thereto. For example, the second electrical length K2 may be substantially between 6 mm and 7 mm, but the present disclosure is not limited thereto. In the present disclosure, the second electrical length K2 is exemplified as 0.6 times of the wavelength corresponding to the central frequency of the antenna structures U operating in the first operating frequency band. In other words, the second electrical length K2 may be a distance between the symmetry centers AP of an antenna structure U of one antenna array of the two adjacent antenna arrays and another antenna structure U of the other antenna array of the two adjacent antenna arrays, and the polarization directions of the afore-mentioned two antenna structures U are identical.

Therefore, the electronic device D may include multiple antenna arrays UG, so as to enhance gain for the electronic device D. In addition, the radiation directions of the electronic device D may also be adjusted by beam forming, so as to increase the radiating angle for each of the antenna structures U.

Figure 15:
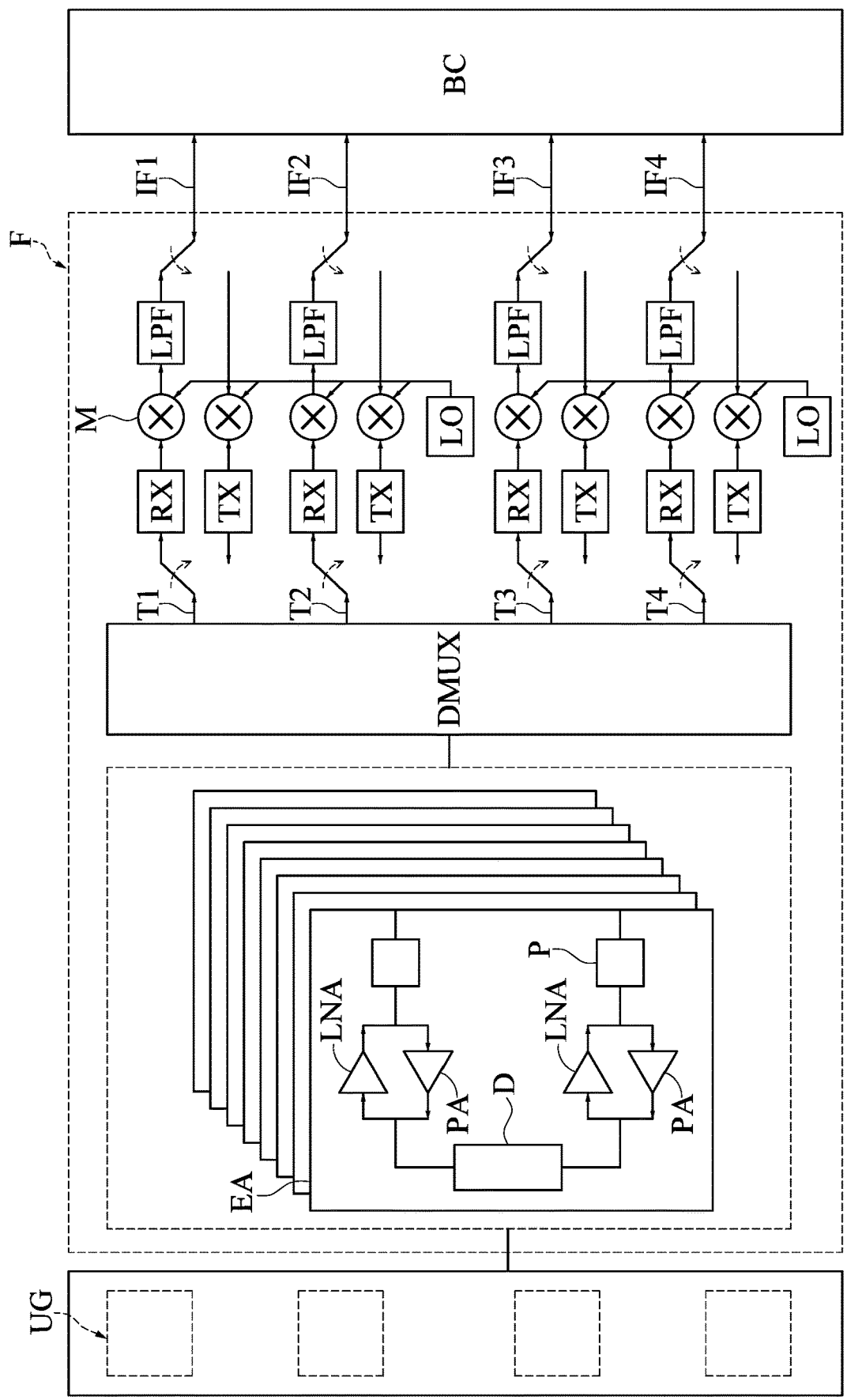
FIG. 15 is yet another functional block diagram of the electronic device in the second embodiment of the present disclosure.

Referring to FIG. 15, a relation between the RF chip F and each antenna structure U will be further described below. More specifically, four of the antenna arrays UG may include eight antenna structures U, and each antenna structure U is connected to an edge amplifier circuit EA. It should be noted that, for the simplicity of illustration, only one of the edge amplifier circuits EA is illustrated in FIG. 15, and the other edge amplifier circuits EA are stacked behind the edge amplifier circuit EA presented in FIG. 15. In addition, each of the edge amplifier circuits EA may include a diplexer D, a low noise amplifier LNA, a power amplifier PA, and a phase shifter P.

Subsequently, the eight edge amplifier circuits EA are electrically connected to a multiplexer DMUX, and each of the eight edge amplifier circuits EA may transmit signals T1 in the horizontal polarization direction in the first operating frequency band, signals T2 in the vertical polarization direction in the first operating frequency band, signals T3 in the horizontal polarization direction in the second operating frequency band, and signals T4 in the vertical polarization direction in the second operating frequency band to a mixer M. After the signals T1, T2, T3, and T4 are down-converted by a local oscillation LO and pass through a low-pass filter LPF, the first operating frequency band and the second operating frequency band may both be tuned to intermediate frequency signals, (e.g., intermediate frequency signals IF1 of the first operating frequency band in the horizontal polarization direction, intermediate frequency signals IF2 of the first operating frequency band in the vertical polarization direction, intermediate frequency signal IF3 of the second operating frequency band in the horizontal polarization direction, and intermediate frequency signals IF4 of the second operating frequency band in the vertical polarization direction) so as to have a signal connection with a base band circuit BC at a back-end. In addition, for example, respective frequencies of the intermediate frequency signals IF1 in the horizontal polarization direction, the intermediate frequency signals IF2 in the vertical polarization direction, and the intermediate frequency signals IF3 in the horizontal polarization direction, and/or the intermediate frequency signals IF4 in the vertical polarization direction may be identical to or different from one another.

Beneficial Effects of Embodiments

One of the beneficial effects of the electronic device D and the antenna structure U thereof of the present disclosure is that, impedance matching in a first operating frequency band and a second operating frequency band is improved by virtue of "the feeding member 2" and "the first predetermined gap C1 between the feeding member 2 and the first radiating member 1". Besides, the bandwidth of the low frequency band is increased by virtue of "the second predetermined gap C2 between the main body 31 and the first radiating member 1" and "the path that electrically connects the second radiating member 3 with the grounding member 4", such that an impedance bandwidth of the antenna structure U with a single feed is increased and that the impedance matching is enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:
   a first radiating member;
   a feeding member disposed on a first side of the first radiating member, a first predetermined gap being between the feeding member and the first radiating member, wherein the feeding member, the first predetermined gap, and the first radiating member resonate to generate a low frequency band and a high frequency band;
   a second radiating member disposed on a second side opposite to the first side of the first radiating member, wherein the second radiating member includes a main body and a grounding part, and a second predetermined gap is between the main body and the first radiating member, and the grounding part, the main body, and the second predetermined gap resonate to increase a bandwidth of the low frequency band; and
   a grounding member disposed on the first side of the first radiating member, and the grounding part being electrically connected to the grounding member.

2. The antenna structure according to claim 1, wherein the first radiating member has an opening, the opening goes through the first radiating member, and the grounding part is electrically connected to the grounding member through the opening.

3. The antenna structure according to claim 1, wherein an orthographic projection of the feeding member onto the first radiating member and an orthographic projection of the grounding part onto the first radiating member are located at two diagonally opposite corners of the first radiating member.

4. The antenna structure according to claim 1, wherein the first radiating member is in a shape of a rectangle, and the first radiating member has a long side and a short side, the long side of the first radiating member resonates at the low frequency band, and the short side of the first radiating member resonates at the high frequency band.

5. The antenna structure according to claim 1, wherein the low frequency band is a 28 GHz frequency band, and the high frequency band is a 39 GHz frequency band.

6. The antenna structure according to claim 1, wherein the feeding member includes a feeding part and a coupling part electrically connected to the feeding part, and the first predetermined gap is between the coupling part and the first radiating member.

7. The antenna structure according to claim 1, wherein the first predetermined gap is between 0.05 mm and 0.15 mm, and the second predetermined gap is between 0.15 mm and 0.25 mm.

8. An electronic device, comprising:
   a plurality of antenna arrays, each of the antenna arrays including two adjacent antenna structures in different polarization directions, wherein each of the two antenna structures includes:
   a first radiating member;
   a feeding member disposed on a first side of the first radiating member, a first predetermined gap being between the feeding member and the first radiating member, wherein the feeding member, the first predetermined gap, and the first radiating member resonate to generate a low frequency band and a high frequency band;
   a second radiating member disposed on a second side opposite to the first side of the first radiating member, wherein the second radiating member includes a main body and a grounding part, and a second predetermined gap is between the main body and the first radiating member, and the grounding part, the main body, and the second predetermined gap resonate to increase a bandwidth of the low frequency band; and
   a grounding member disposed on the first side of the first radiating member, and the grounding part being electrically connected to the grounding member;
   a plurality of signal sources, each of the signal sources corresponding to a corresponding one of the antenna structures, wherein each of the signal sources includes a feeding end and a grounding end, the feeding end is electrically connected to the feeding member of the corresponding one of the antenna structures, and the grounding end is electrically connected to the grounding member of the corresponding one of the antenna structures; and
   a radio frequency chip electrically connected to the signal sources.

9. The electronic device according to claim 8, wherein the first radiating member of each of the antenna structures is in a shape of a rectangle, and the first radiating member has a long side and a short side, the long side of the first radiating member resonates at the low frequency band, and the short side of the first radiating member resonates at the high frequency band.

10. The electronic device according to claim 8, wherein each of the antenna structures has a symmetry center, a first electric length is defined between the symmetry centers of the two adjacent antenna structures of each of the antenna arrays, the first electric length is between 0.25 times and 0.35 times a wavelength corresponding to a central frequency of the low frequency band.

11. The electronic device according to claim 8, wherein the first radiating member has an opening, the opening goes through the first radiating member, and the grounding part is electrically connected to the grounding member through the opening.

12. The electronic device according to claim 8, wherein an orthographic projection of the feeding member onto the first radiating member and an orthographic projection of the grounding part onto the first radiating member are located at two diagonally opposite corners of the first radiating member.

13. The electronic device according to claim 8, wherein the low frequency band is a 28 GHz frequency band, and the high frequency band is a 39 GHz frequency band.

14. The electronic device according to claim 8, wherein the feeding member includes a feeding part and a coupling part electrically connected to the feeding part, and the first predetermined gap is between the coupling part and the first radiating member.

15. The electronic device according to claim 8, wherein the first predetermined gap is between 0.05 mm and 0.15 mm, and the second predetermined gap is between 0.15 mm and 0.25 mm.

* * * * *